United States Patent
Chiu

(12) 
(10) Patent No.: US 12,531,446 B2
(45) Date of Patent: Jan. 20, 2026

(54) WIRELESS CHARGER AND THE METHOD TO MAKE THE SAME

(71) Applicant: CYNTEC CO., LTD., Hsinchu (TW)

(72) Inventor: Kuan Yu Chiu, Miaoli County (TW)

(73) Assignee: CYNTEC CO., LTD., Hsinchu (TW)

( * ) Notice: Subject to any disclaimer, the term of this patent is extended or adjusted under 35 U.S.C. 154(b) by 838 days.

(21) Appl. No.: 17/837,058

(22) Filed: Jun. 10, 2022

(65) Prior Publication Data

US 2022/0399754 A1 Dec. 15, 2022

Related U.S. Application Data

(60) Provisional application No. 63/208,989, filed on Jun. 10, 2021.

(51) Int. Cl.

| | |
|---|---|
| *H01M 10/44* | (2006.01) |
| *H01M 10/46* | (2006.01) |
| *H02J 7/00* | (2006.01) |
| *H02J 50/00* | (2016.01) |
| *H02J 50/10* | (2016.01) |
| *H02J 50/40* | (2016.01) |
| *H02J 50/70* | (2016.01) |
| *H02J 50/90* | (2016.01) |

(52) U.S. Cl.
CPC ............ *H02J 50/90* (2016.02); *H02J 7/0042* (2013.01); *H02J 7/0044* (2013.01); *H02J 50/005* (2020.01); *H02J 50/10* (2016.02); *H02J 50/402* (2020.01); *H02J 50/70* (2016.02)

(58) Field of Classification Search
CPC .......... H02J 50/005; H02J 50/70; H02J 50/90; H02J 7/0042; H02J 7/0044; H02J 7/02; H01F 38/14; H01F 27/025; H05K 7/2039
USPC ................................ 320/107, 108, 114, 116
See application file for complete search history.

(56) References Cited

U.S. PATENT DOCUMENTS

| | | | | |
|---|---|---|---|---|
| 6,317,321 B1 * | 11/2001 | Fitch | ....................... | G06F 1/203 174/15.2 |
| 2009/0154113 A1 * | 6/2009 | MacDonald | ....... | H05K 7/20518 29/829 |

FOREIGN PATENT DOCUMENTS

| | | | | |
|---|---|---|---|---|
| CN | 209200727 U | 8/2019 | | |
| WO | WO-2022252019 A1 * | 12/2022 | .............. | B60L 53/14 |

OTHER PUBLICATIONS

Machine translate of WO2022/252019 (Aug. 12, 2022) (Year: 2022).*

* cited by examiner

*Primary Examiner* — Edward Tso
(74) *Attorney, Agent, or Firm* — Min-Lee Teng

(57) ABSTRACT

A wireless charger having coils disposed in a recess of a metallic case of the wireless charger, wherein a heat-conducting material is disposed in the recess to encapsulate the coils with the first heat-conducting material being in contact with the coils, a sidewall, and a bottom surface of the recess.

20 Claims, 7 Drawing Sheets

WIRELESS CHARGER AND THE METHOD TO MAKE THE SAME

CROSS-REFERENCE TO RELATED APPLICATIONS

This application claims the benefit of U.S. Provisional Application Ser. No. 63/208,989 filed on Jun. 10, 2021, wherein the entirety of the Provisional Application is incorporated by reference herein.

BACKGROUND OF THE INVENTION

Field of the Invention

The invention relates to a wireless charger for charging an electronic device.

Description of the Related Art

As wireless charging for consumer and automotive devices become more and more popular, however, when the temperature of a mobile phone being wirelessly charged reaches a particular temperature, the mobile phone will stop the high-wattage fast charge charging mode and start to drop the load to keep the mobile phone's temperature under the particular temperature, which will increase the time to fully charge the mobile phone.

Accordingly, the present invention proposes a better solution to overcome the above-mentioned problems.

SUMMARY OF THE INVENTION

One objective of the present invention is to provide a wireless charger for charging an electronic device, wherein a heat-conducting material is disposed on the transmitting coils of the wireless charger to encapsulate the transmitting coils, wherein the first heat-conducting material is in contact with a metallic case of the wireless charger for lowering the temperature of the coils.

In one embodiment, a wireless charger is disclosed, wherein the wireless charger comprises: a metallic case, wherein a first recess is formed in the metallic case; and at least one coil, wherein the at least one coil is disposed in the first recess, wherein a first heat-conducting material is disposed on a top surface of the at least one coil to encapsulate the at least one coil, wherein the first heat-conducting material fills into a space between a sidewall of the first recess and the at least one coil with the heat-conducting material being in contact with said sidewall and a bottom surface of the first recess.

In one embodiment, the bulk conductivity of the first heat-conducting material is not greater than 10000.

In one embodiment, the thermal conductivity K of the first heat-conducting material is in a range of 0.1~10 W/(m·K).

In one embodiment, the wireless charger comprises a top cover comprising a second heat-conducting material, wherein the first recess is formed on the upper side of the metallic case, wherein the second heat-conducting material is in contact with the first heat-conducting material disposed in the first recess.

In one embodiment, the wireless charger comprises a first circuit board disposed on a second recess formed on the lower side of the metallic case.

In one embodiment, the first heat-conducting material comprises a polymer integrated with at least one of the following high thermal-conductivity particles: graphene, aluminum oxide, aluminum nitride, and magnesium oxide.

In one embodiment, the first heat-conducting material comprises silicon glue integrated with at least one of the following high thermal-conductivity particles: graphene, aluminum oxide, aluminum nitride, and magnesium oxide.

In one embodiment, the first heat-conducting material comprises epoxy glue integrated with at least one of the following high thermal-conductivity particles: graphene, aluminum oxide, aluminum nitride, and magnesium oxide.

In one embodiment, the first heat-conducting material comprises an adhesive material integrated with at least one of the following high thermal-conductivity particles: graphene, aluminum oxide, aluminum nitride, and magnesium oxide.

In one embodiment, the first heat-conducting material comprises silicon glue integrated with $Al_2O_3$.

In one embodiment, the at least one coil comprises a plurality of coils disposed in the first recess, wherein the plurality of coils are stacked into a plurality of layers for charging the electronic device.

In one embodiment, each of the at least one coil is made of an enameled wire.

In one embodiment, a method to form a wireless charger is disclosed, wherein the method comprises: forming a metallic case, wherein a first recess is formed in the metallic case; and disposing at least one coil in the first recess; disposing a first heat-conducting material on a top surface of the at least one coil to encapsulate the at least one coil, wherein the first heat-conducting material fills into a space between a sidewall of the first recess and the at least one coil with the heat-conducting material being in contact with said sidewall and a bottom surface of the first recess.

BRIEF DESCRIPTION OF THE DRAWINGS

The present invention can be more fully understood by reading the subsequent description and examples with references made to the accompanying drawings, wherein.

DETAILED DESCRIPTION OF THE INVENTION

Figure 1A:
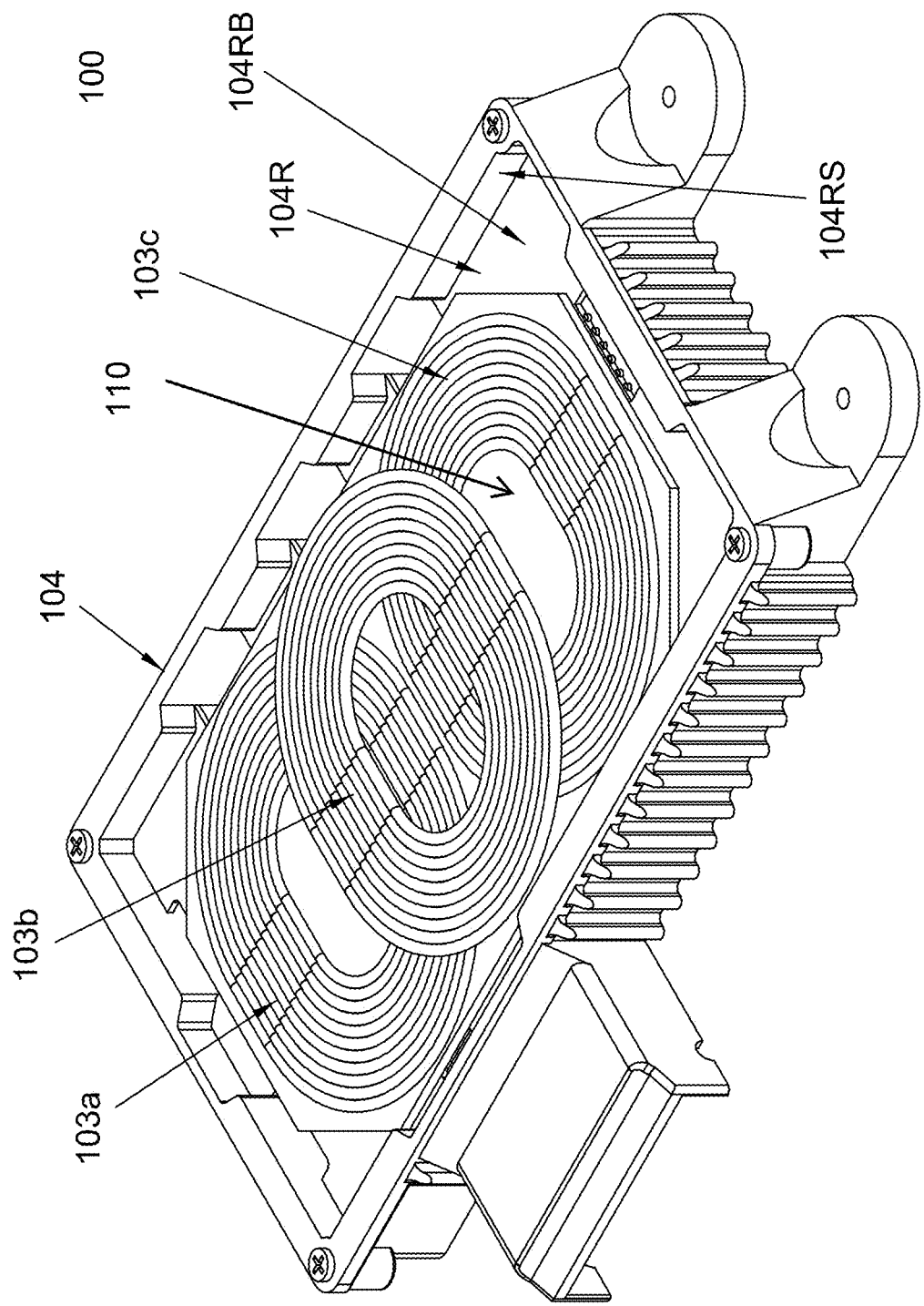
FIG. 1A is a top view of a wireless charger with at least one coil disposed in a recess of a metallic case according to one embodiment of the invention.

It is understood that the following disclosure provides many different embodiments, or examples, for implementing different features of the invention. Specific examples of devices and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features are formed between the first and second features such that the first and second features are not in direct contact. In addition, the present disclosure may repeat reference numerals and/or letters in the various examples. This repetition is for simplicity and clarity and does not in itself dictate a relationship between the various embodiments and/or configurations discussed.

Figure 1B:
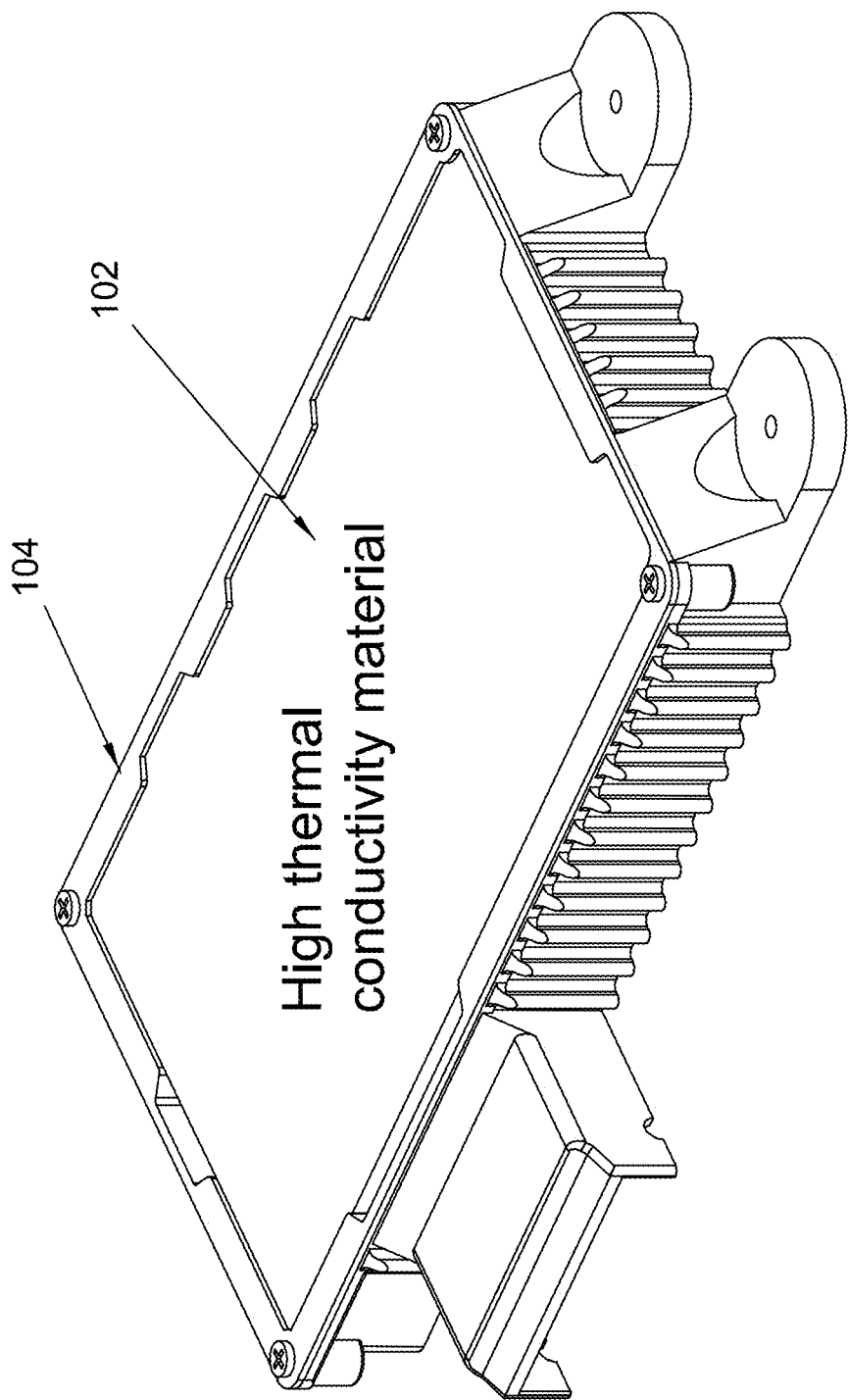
FIG. 1B is a top view of a wireless charger with a heat-conducting material disposed in the recess to encapsulate the at least one coil according to one embodiment of the invention.
Figure 1C:
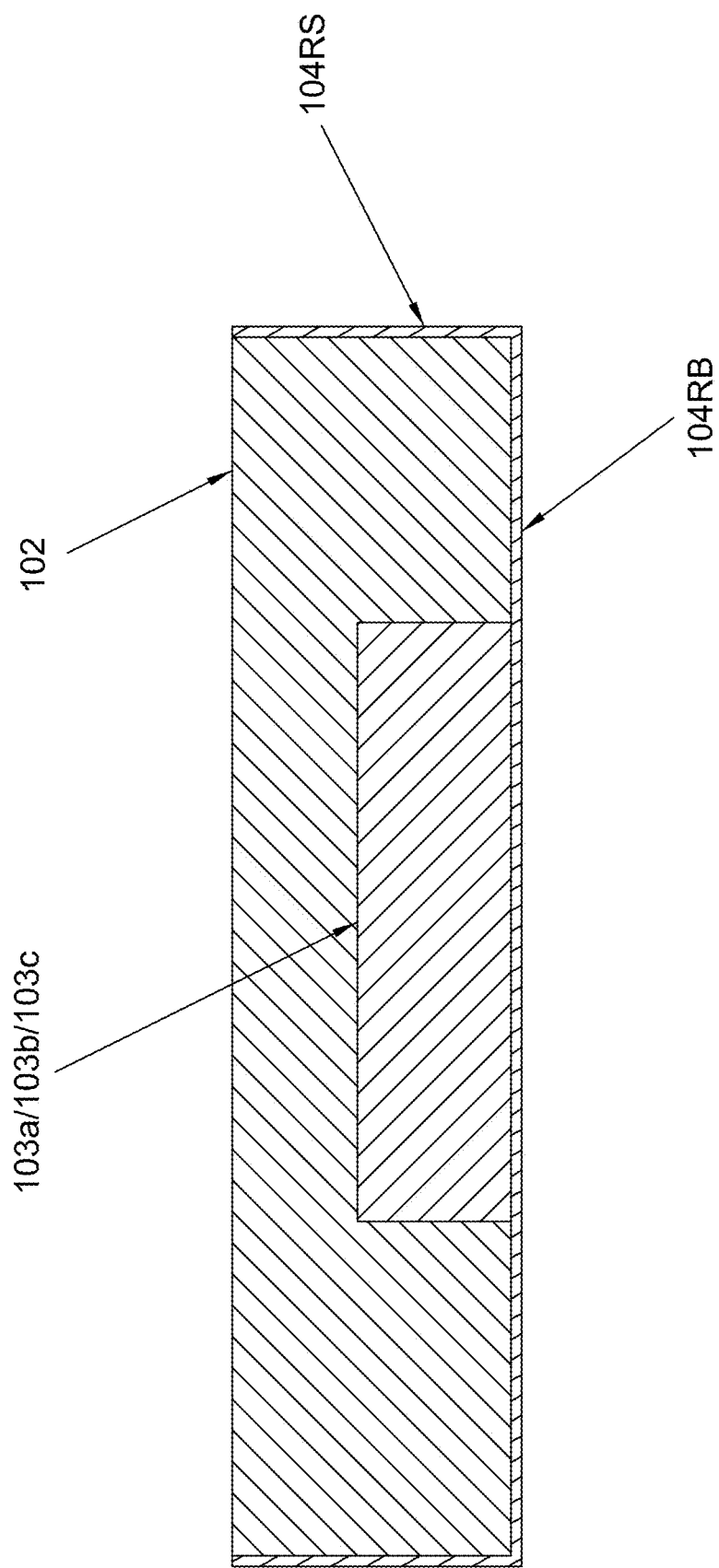
FIG. 1C is a side view of a wireless charger with a heat-conducting material disposed in the recess to encapsulate the at least one coil according to one embodiment of the invention.

FIG. 1A is a top view of a wireless charger with at least one coil disposed in a recess of a metallic case according to one embodiment of the invention, FIG. 1B is a top view of the wireless charger with a heat-conducting material disposed in the recess to encapsulate the at least one coil according to one embodiment of the invention, and FIG. 1C is a side view of a wireless charger with a heat-conducting material disposed in the recess to encapsulate the at least one coil according to one embodiment of the invention.

Please refer to FIG. 1A, FIG. 1B, and FIG. 1C, wherein the wireless charger 100 comprises: a metallic case 104, wherein a first recess 104R is formed in the metallic case 104; and at least one coil 103a, 103b, 103c disposed in the first recess 104R, wherein a first heat-conducting material 102 is disposed on a top surface of the at least one coil 103a, 103b, 103c to encapsulate the at least one coil 103a, 103b, 103c, wherein the first heat-conducting material 102 fills into a space between a sidewall 104RS of the first recess 104R and the at least one coil 103a, 103b, 103c with the heat-conducting material 102 being in contact with the said sidewall 104RS and a bottom surface 104RB of the first recess 104R, as shown in FIG. 1C.

In one embodiment, a bulk conductivity of the first heat-conducting material 102 is not greater than 10000 siemens/m.

In one embodiment, the thermal conductivity K of the first heat-conducting material 102 is in a range of 0.1~10 W/(m·K).

In one embodiment, the first heat-conducting material 102 comprises a polymer integrated with at least one of the following high thermal-conductivity particles: graphene, aluminum oxide, aluminum nitride, and magnesium oxide.

In one embodiment, the first heat-conducting material 102 comprises epoxy glue integrated with at least one of the following high thermal-conductivity particles: graphene, aluminum oxide, aluminum nitride, and magnesium oxide.

In one embodiment, the first heat-conducting material 102 comprises silicon glue integrated with at least one of the following high thermal-conductivity particles: graphene, aluminum oxide, aluminum nitride, and magnesium oxide.

In one embodiment, the first heat-conducting material 102 comprises silicon glue and $Al_2O_3$.

In one embodiment, the at least one coil comprises a plurality of coils, wherein the plurality of coils are stacked into a plurality of layers for charging the electronic device.

In one embodiment, each of the at least one coil 103a, 103b, 103c is made of an enameled wire.

In one embodiment, each of the at least one coil 103a, 103b, 103c is made of a wire containing a self-adhesive layer.

In one embodiment, each of the at least one coil 103a, 103b, 103c is disposed on a magnetic sheet 110, as shown in FIG. 1A.

In one embodiment, the magnetic sheet 110 is tightly bonded to the metallic case 104, as shown in FIG. 1A.

In one embodiment, the magnetic sheet comprises at least one of the following: MnZn or NiZn, ferrite, and nanocrystalline.

In one embodiment, the magnetic sheet is made by sintering or ceramic injection molding methods.

Figure 1D:
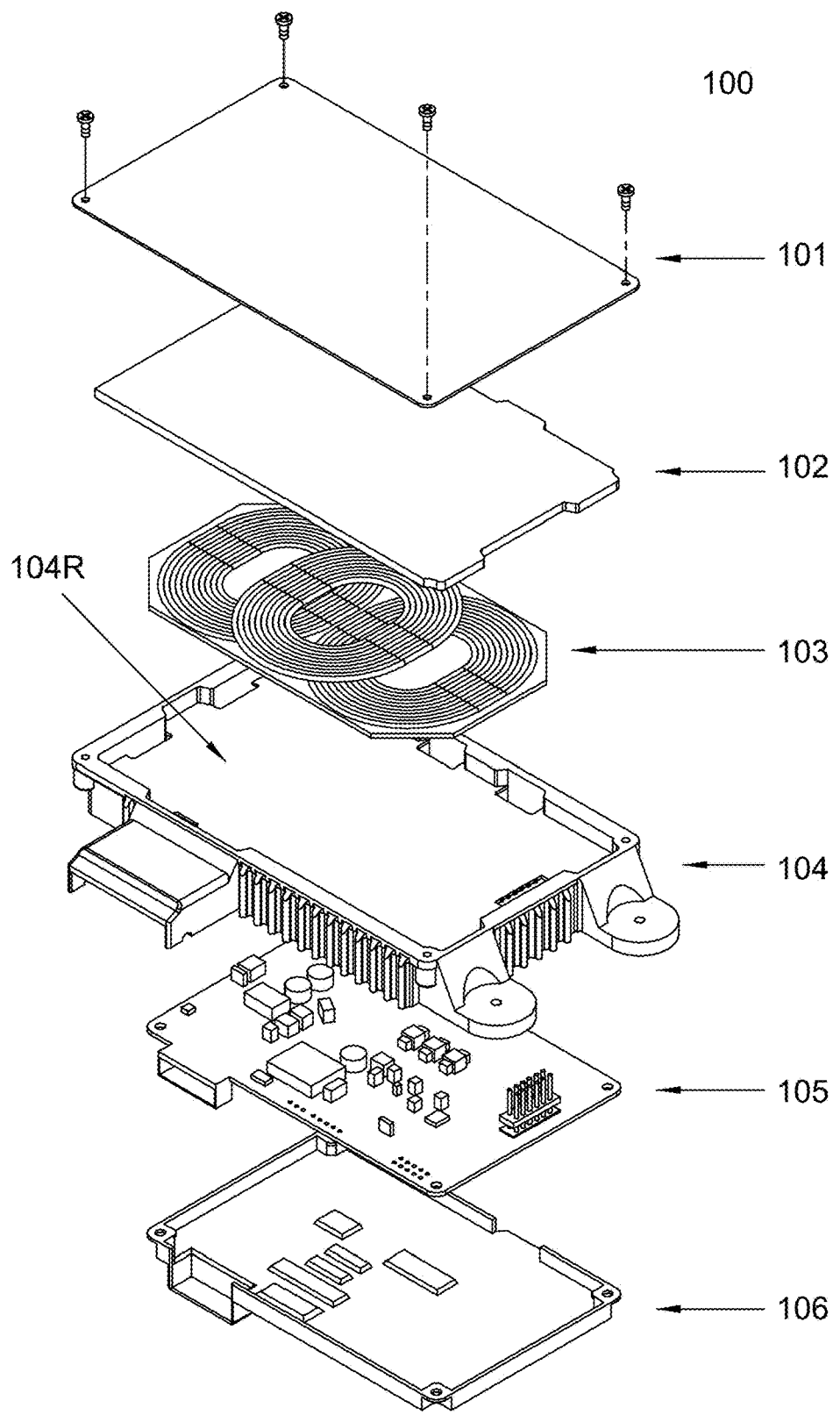
FIG. 1D is an exploded view of a wireless charger according to one embodiment of the invention.

FIG. 1D is a top exploded view of a wireless charger 100 according to one embodiment of the invention, wherein the wireless charger 100 comprises: a thermal-conductive plastic cover 101; a heat-conducting material 102; at least one coil 103; a metallic case 104, wherein the at least one coil 103 and the first heat-conducting material 102 are disposed in an recess 104R of the metallic case 104.

In one embodiment, as shown in FIG. 1C, the metallic case 104 comprises a metallic plate, wherein the first recess 104R is formed on an upper side of the metallic plate of the metallic case 104, wherein a second recess is formed on a lower side of the metallic plate of the metallic case 104, wherein a first circuit board 105 is disposed in the second recess of the metallic case 104.

In one embodiment, the first circuit board 105 comprises a PCB board, wherein at least one of the following is disposed on the PCB board: NFC, NTC, 5G antenna+FAKRA connector, and EMI shielding pattern.

In one embodiment, the wireless charger 100 comprises a bottom cover 106 disposed under the first circuit board 105.

Figure 2:
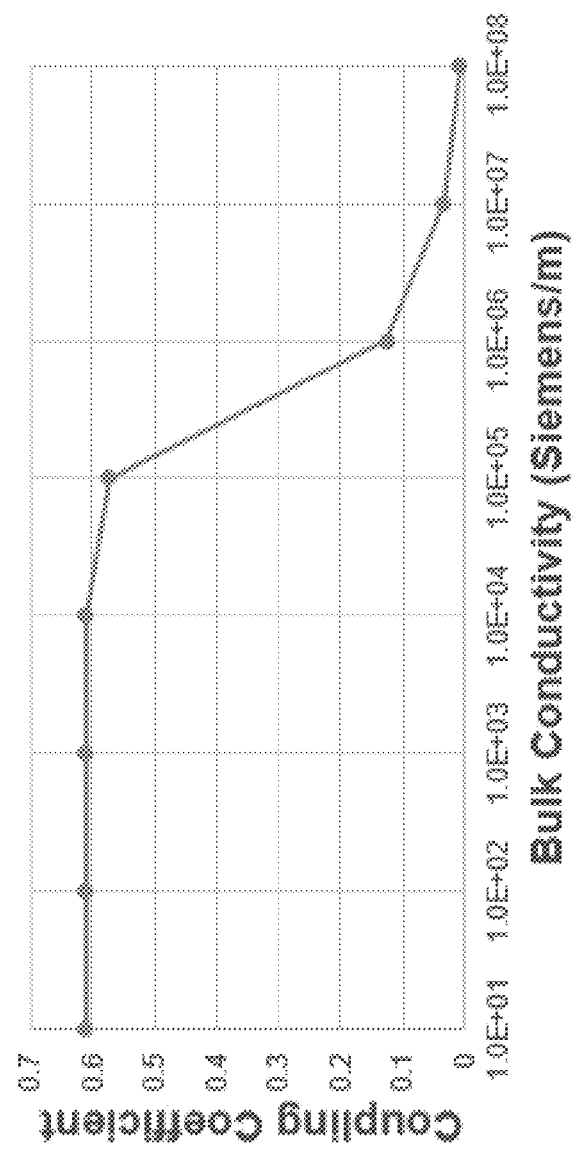
FIG. 2 shows a chart between the coupling coefficient between the transmit coil of the wireless charger and the receive coil of the electronic device being wirelessly charged and the bulk conductivity of the first heat-conducting material 102.

FIG. 2 shows a chart between the coupling coefficient between the transmit coil of the wireless charger and the receive coil of the electronic device being wirelessly charged and the bulk conductivity of the first heat-conducting material.

As shown in FIG. 2, when the bulk conductivity is greater than 10000, the coupling coefficient between the transmit coil of the wireless charger and the receive coil of the electronic device being wirelessly charged begins to decrease.

The bulk conductivity of the first heat-conducting material will also increase when the thermal conductivity of the first heat-conducting material increases. That is, the thermal conductivity of the first heat-conducting material has an upper limit for keeping a good coupling coefficient between the transmit coil of the wireless charger and the receive coil of the electronic device.

Figure 3:
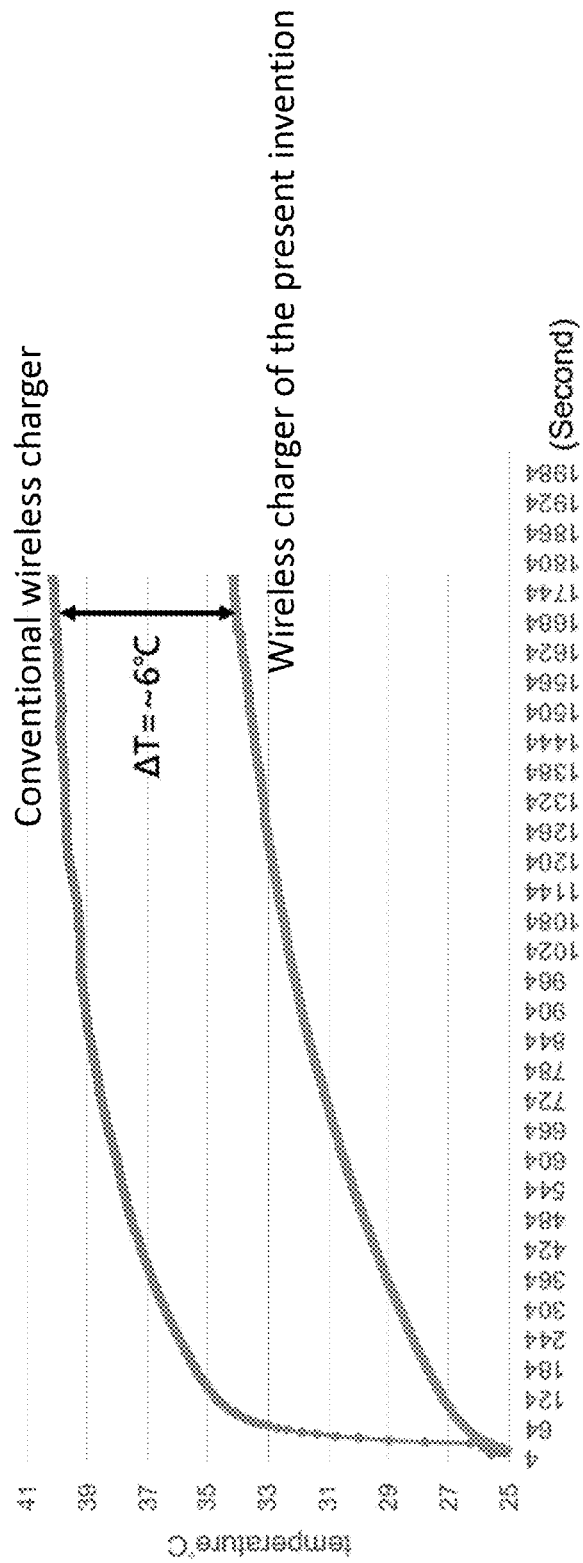
FIG. 3 shows a chart between the temperature of a wireless charger of the present invention and the temperature of the coils of a conventional wireless charger.

FIG. 3 shows a chart between the temperature of a wireless charger of the present invention and the temperature of the coils of a conventional wireless charger.

As shown in FIG. 3, the temperature of the coils of a wireless charger of the present invention can be maintained lower than 34.2° C. compared with the temperature of the coils of a conventional wireless charger which can be at 40° C.

Figure 4:
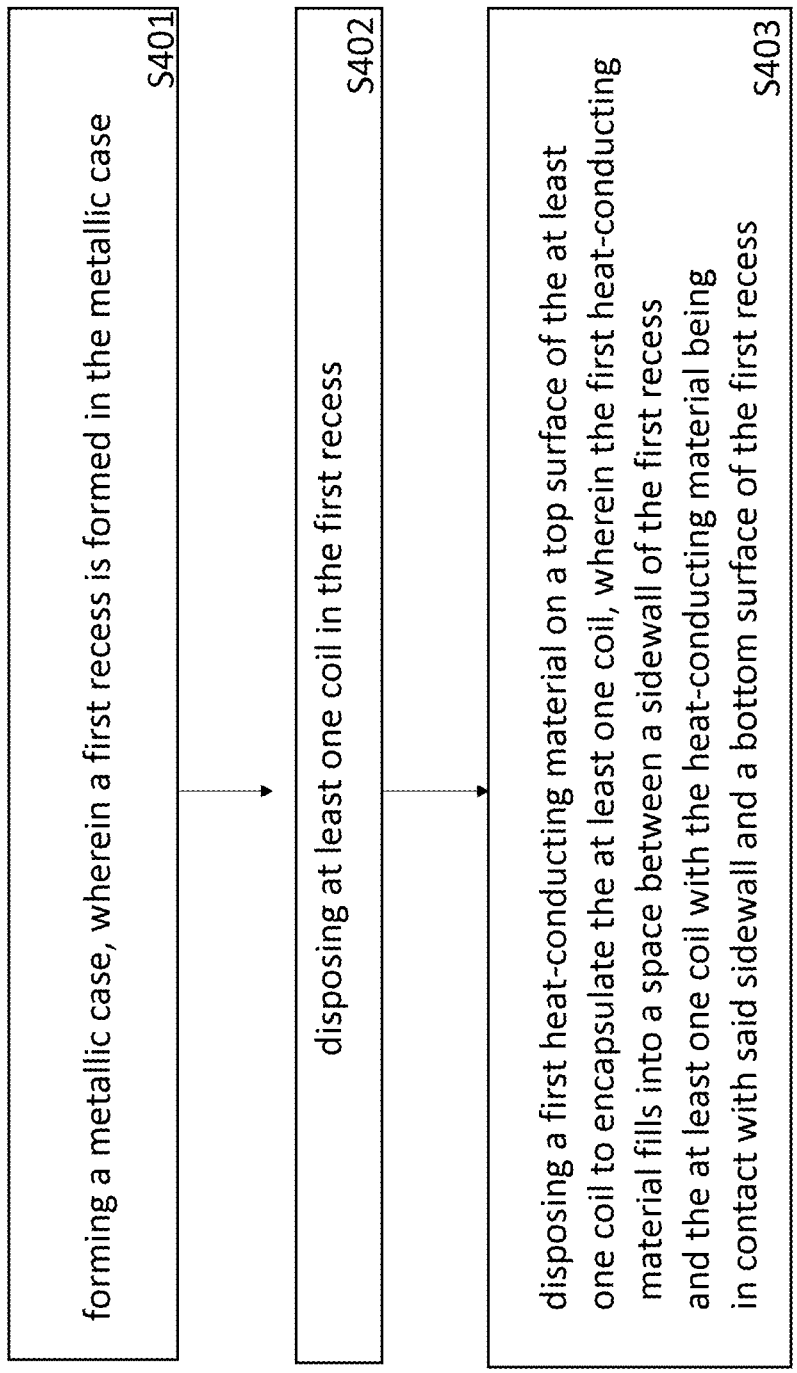
FIG. 4 shows a flow chart of a method to form a wireless charger according to one embodiment of the invention.

In one embodiment, as shown in FIG. 4, a method to form a wireless charger is disclosed, wherein the method comprises: S401: forming a metallic case, wherein a first recess is formed in the metallic case; S402: disposing at least one coil in the first recess; and S403: disposing a first heat-conducting material on a top surface of the at least one coil to encapsulate the at least one coil, wherein the first heat-conducting material fills into a space between a sidewall of the first recess and the at least one coil with the heat-conducting material being in contact with said sidewall and a bottom surface of the first recess.

In one embodiment, the first heat-conducting material is in a semi-cured state when the first heat-conducting material is disposed on the top surface of the at least one coil and filled into the space between the sidewall of the first recess and the at least one coil.

In one embodiment, the bulk conductivity of the first heat-conducting material 102 is not greater than 10000 siemens/m.

In one embodiment, the thermal conductivity K of the first heat-conducting material 102 is in a range of 0.1~10 W/(m·K).

In one embodiment, the at least one coil 103 comprises a plurality of coils, wherein the plurality of coils are stacked into a plurality of layers for wirelessly charging the electronic device.

In one embodiment, each of the at least one coil 103 is made of an enameled wire.

In one embodiment, each of the at least one coil 103 is made of a wire containing a self-adhesive layer.

From the foregoing, it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A wireless charger, comprising:
   a metallic case, wherein a first recess is formed in the metallic case; and
   at least one coil, disposed on a top surface of a magnetic sheet;
   wherein the at least one coil and the magnetic sheet are disposed in the first recess, wherein a first heat-conducting material is disposed on a top surface of the at least one coil to encapsulate the at least one coil and the magnetic sheet, wherein the first heat-conducting material fills into a space between a sidewall of the first recess and the at least one coil with the heat-conducting material being in contact with said sidewall and a bottom surface of the first recess, wherein the magnetic sheet is tightly bonded to the metallic case.

2. The wireless charger of claim 1, wherein a bulk conductivity of the first heat-conducting material is not greater than 10000 siemens/m.

3. The wireless charger of claim 1, wherein the thermal conductivity K of the first heat-conducting material is in a range of 0.1~10 W/(m·K).

4. The wireless charger of claim 1, wherein the wireless charger comprises a top cover comprising a second heat-conducting material, wherein the second heat-conducting material is in contact with the first heat-conducting material.

5. The wireless charger of claim 4, wherein the wireless charger comprises a first circuit board disposed on a second recess formed on a lower side of the metallic case.

6. The wireless charger of claim 1, wherein the first heat-conducting material comprises an adhesive material integrated with at least one of the following particles: graphene, aluminum oxide, aluminum nitride, and magnesium oxide.

7. The wireless charger of claim 1, wherein the first heat-conducting material comprises a polymer integrated with at least one of the following particles: graphene, aluminum oxide, aluminum nitride, and magnesium oxide.

8. The wireless charger of claim 1, wherein the first heat-conducting material comprises silicon glue integrated with at least one of the following particles: graphene, aluminum oxide, aluminum nitride, and magnesium oxide.

9. The wireless charger of claim 1, wherein the first heat-conducting material comprises epoxy glue integrated with at least one of the following particles: graphene, aluminum oxide, aluminum nitride, and magnesium oxide.

10. The wireless charger of claim 1, wherein the first heat-conducting material comprises silicon glue integrated with $Al_2O_3$.

11. The wireless charger of claim 1, wherein the at least one coil comprises a plurality of coils disposed in the first recess, wherein the plurality of coils are stacked into a plurality of layers for charging the electronic device.

12. The wireless charger of claim 1, wherein each of the at least one coil is made of an enameled wire.

13. A method to form a wireless charger, comprising:
    forming a metallic case, wherein a first recess is formed in the metallic case;
    disposing at least one coil and a magnetic sheet in the first recess, wherein the at least one coil is disposed on a top surface of the magnetic sheet; and
    disposing a first heat-conducting material on a top surface of the at least one coil to encapsulate the at least one coil and the magnetic sheet, wherein the first heat-conducting material fills into a space between a sidewall of the first recess and the at least one coil with the heat-conducting material being in contact with said sidewall and a bottom surface of the first recess, wherein the magnetic sheet is tightly bonded to the metallic case.

14. The method of claim 13, wherein a bulk conductivity of the first heat-conducting material is not greater than 10000 siemens/m.

15. The method of claim 13, wherein the thermal conductivity K of the first heat-conducting material is in a range of 0.1~10 W/(m·K).

16. The method of claim 13, the first heat-conducting material is in a semi-cured state when the first heat-conducting material is disposed on the top surface of the at least one coil and filled into the space between the sidewall of the first recess and the at least one coil.

17. The method of claim 13, wherein the wireless charger comprises a top cover comprising a second heat-conducting material, wherein the first recess is formed on an upper side of the metallic case, wherein the second heat-conducting material is in contact with the first heat-conducting material.

18. The method of claim 13, wherein the first heat-conducting material comprises an adhesive material integrated with at least one of the following particles: graphene, aluminum oxide, aluminum nitride, and magnesium oxide.

19. The method of claim 13, wherein the first heat-conducting material comprises a polymer integrated with at least one of the following particles: graphene, aluminum oxide, aluminum nitride, and magnesium oxide.

20. The method of claim 13, wherein the first heat-conducting material comprises silicon glue integrated with at least one of the following particles: graphene, aluminum oxide, aluminum nitride, and magnesium oxide.

* * * * *